(12) United States Patent  (10) Patent No.: US 8,960,041 B2
Buhrke  (45) Date of Patent: Feb. 24, 2015

(54) SHIFTING ARRANGEMENT FOR DISPLACING A SELECTOR FORK

(75) Inventor: Frank Buhrke, Birkenau (DE)

(73) Assignee: Deere & Company, Moline, IL (US)

( * ) Notice: Subject to any disclaimer, the term of this patent is extended or adjusted under 35 U.S.C. 154(b) by 2138 days.

(21) Appl. No.: 11/990,579

(22) PCT Filed: Jul. 27, 2006

(86) PCT No.: PCT/EP2006/064743
§ 371 (c)(1),
(2), (4) Date: Nov. 9, 2011

(87) PCT Pub. No.: WO2007/020171
PCT Pub. Date: Feb. 22, 2007

(65) Prior Publication Data
US 2013/0298714 A1   Nov. 14, 2013

(30) Foreign Application Priority Data
Aug. 16, 2005  (DE) .......................... 10 2005 038 681

(51) Int. Cl.
*F16H 59/04*  (2006.01)
*F16H 59/02*  (2006.01)
*F16H 63/30*  (2006.01)
*F16H 63/32*  (2006.01)

(52) U.S. Cl.
CPC ................ *F16H 59/02* (2013.01); *F16H 63/30* (2013.01); *F16H 63/32* (2013.01); *F16H 2063/322* (2013.01)
USPC ..................................... 74/473.36; 74/473.28

(58) Field of Classification Search
CPC .......................... F16H 2063/322; F16H 63/38
USPC .................................. 74/473.28, 329, 473.36
See application file for complete search history.

(56) References Cited

U.S. PATENT DOCUMENTS

| 3,331,259 | A |   | 8/1965  | Reimer |
| 4,605,109 | A | * | 8/1986  | Fukuchi et al. ............... 192/219 |
| 5,060,538 | A | * | 10/1991 | Schnell et al. ............. 74/473.28 |
| 5,720,688 | A |   | 2/1998  | Wilson et al. |
| 2004/0154425 | A1 |   | 8/2004  | Showalter |

FOREIGN PATENT DOCUMENTS

| DE | 1920333   | 7/1965 |
| DE | 19833101  | 1/2001 |
| DE | 10342133  | 4/2005 |

OTHER PUBLICATIONS

German Search Report, Dec. 19, 2006, 4 Pages.
PCT Search Report, Oct. 25, 2006, 9 Pages.

* cited by examiner

*Primary Examiner* — David M Fenstermacher
*Assistant Examiner* — Terence Boes
(74) *Attorney, Agent, or Firm* — Quarles & Brady LLP

(57) ABSTRACT

The disclosure relates to a shifting arrangement for displacing a selector fork of a multispeed transmission assembly along a selector rod. The shifting arrangement has a positioning element which is mounted so as to be rotatable about an axis. The positioning element is connected to the selector fork, which is movably mounted on the selector rod, via a driving mechanism designed for converting the rotational movement of the positioning element into a sliding movement of the selector fork along the selector rod. The shifting arrangement further comprises also has a locking device for locking the selector fork in selected operating positions. The locking device is designed for establishing a locking connection between the positioning element and the selector fork.

16 Claims, 7 Drawing Sheets

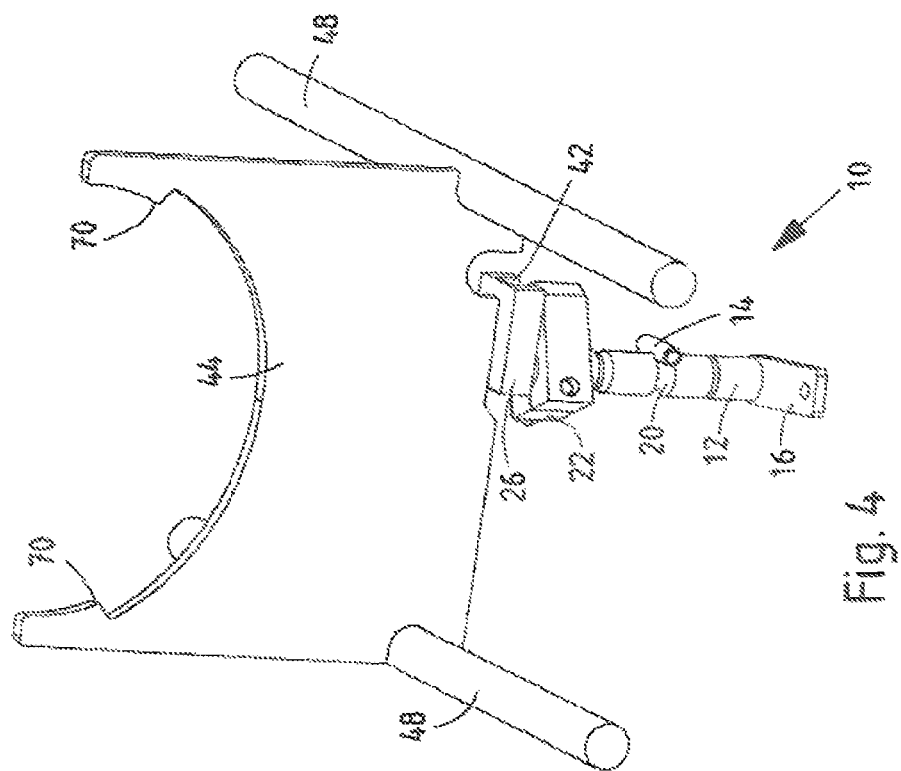
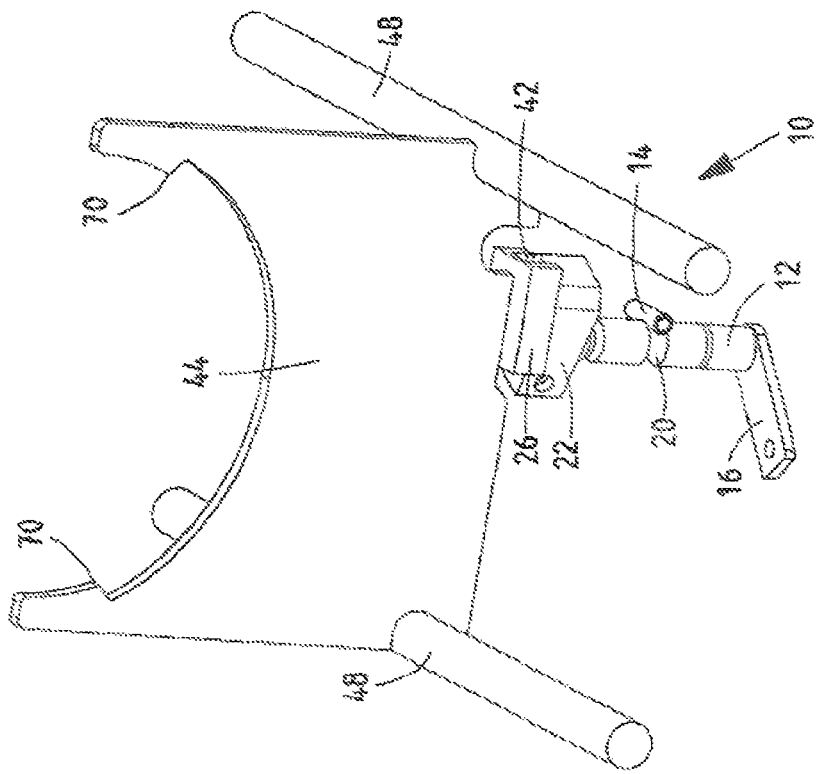

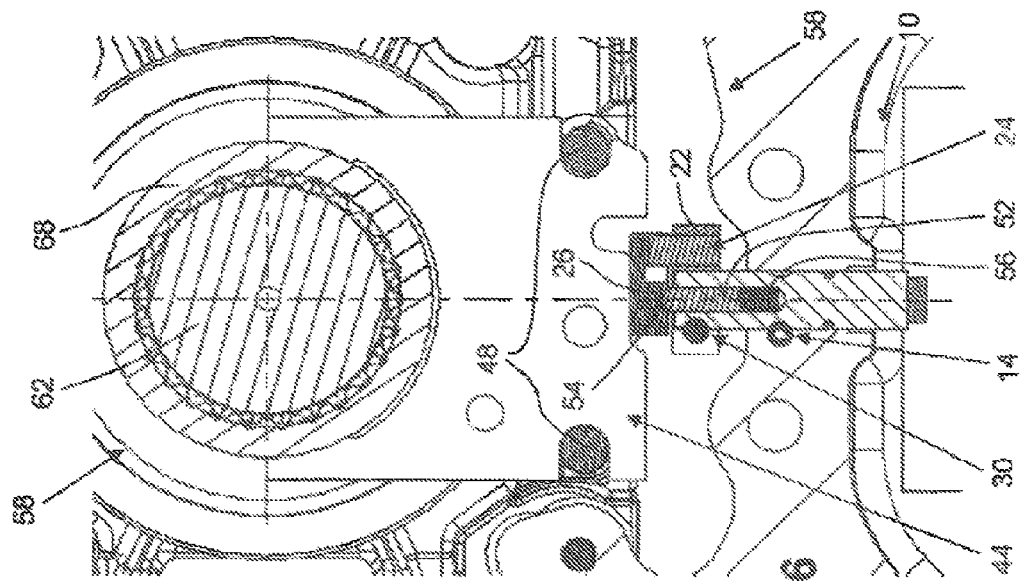
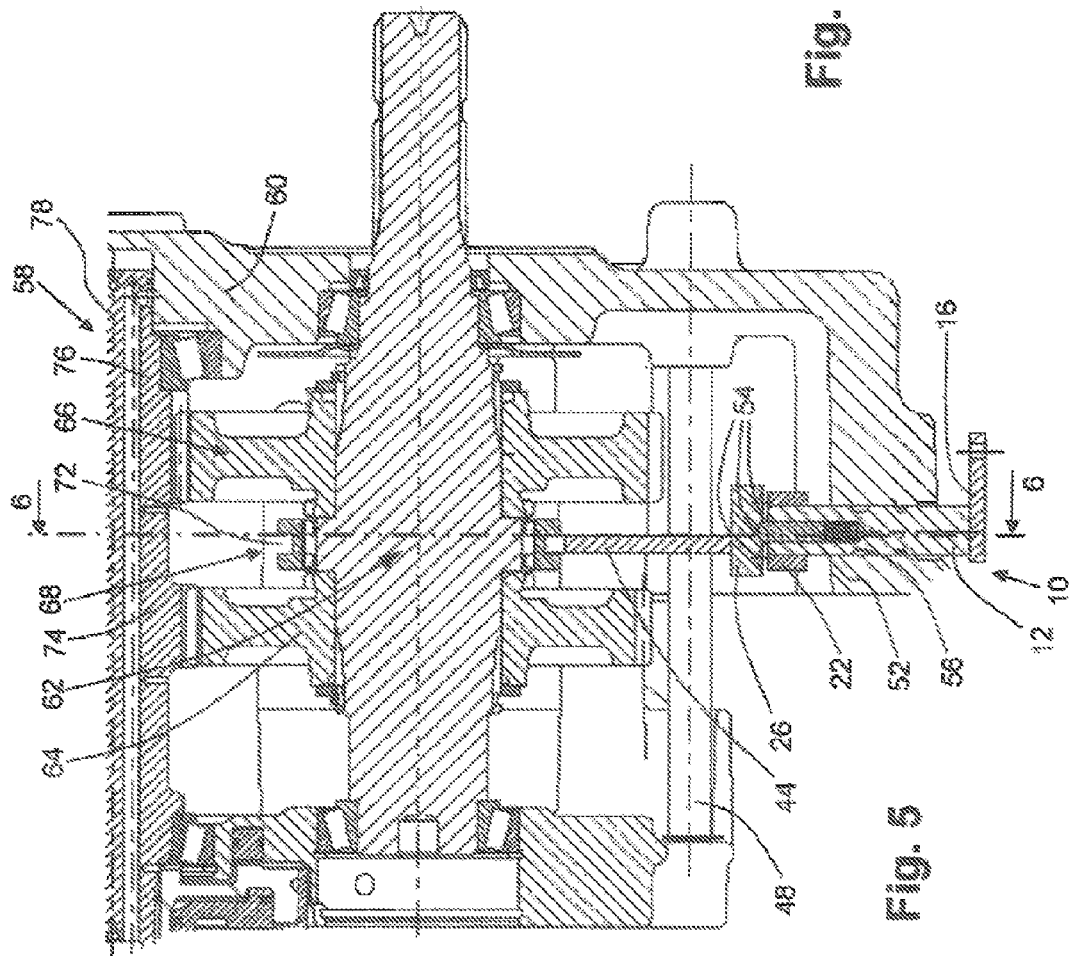

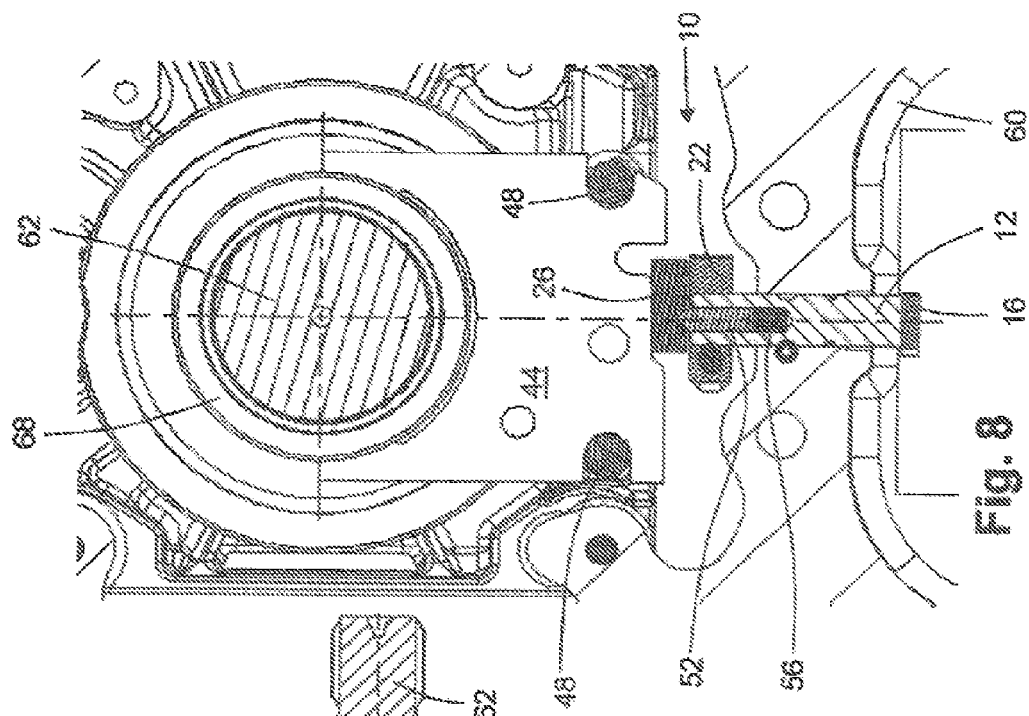
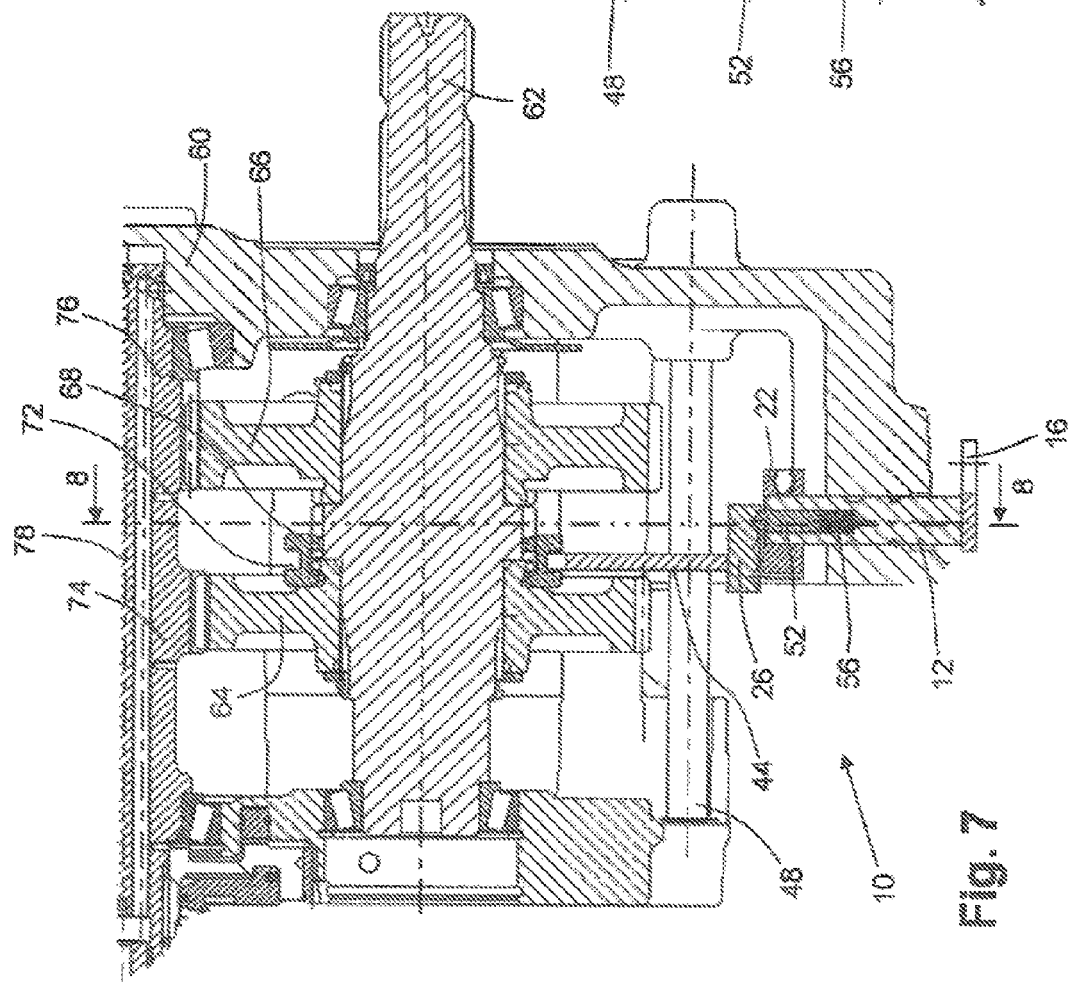

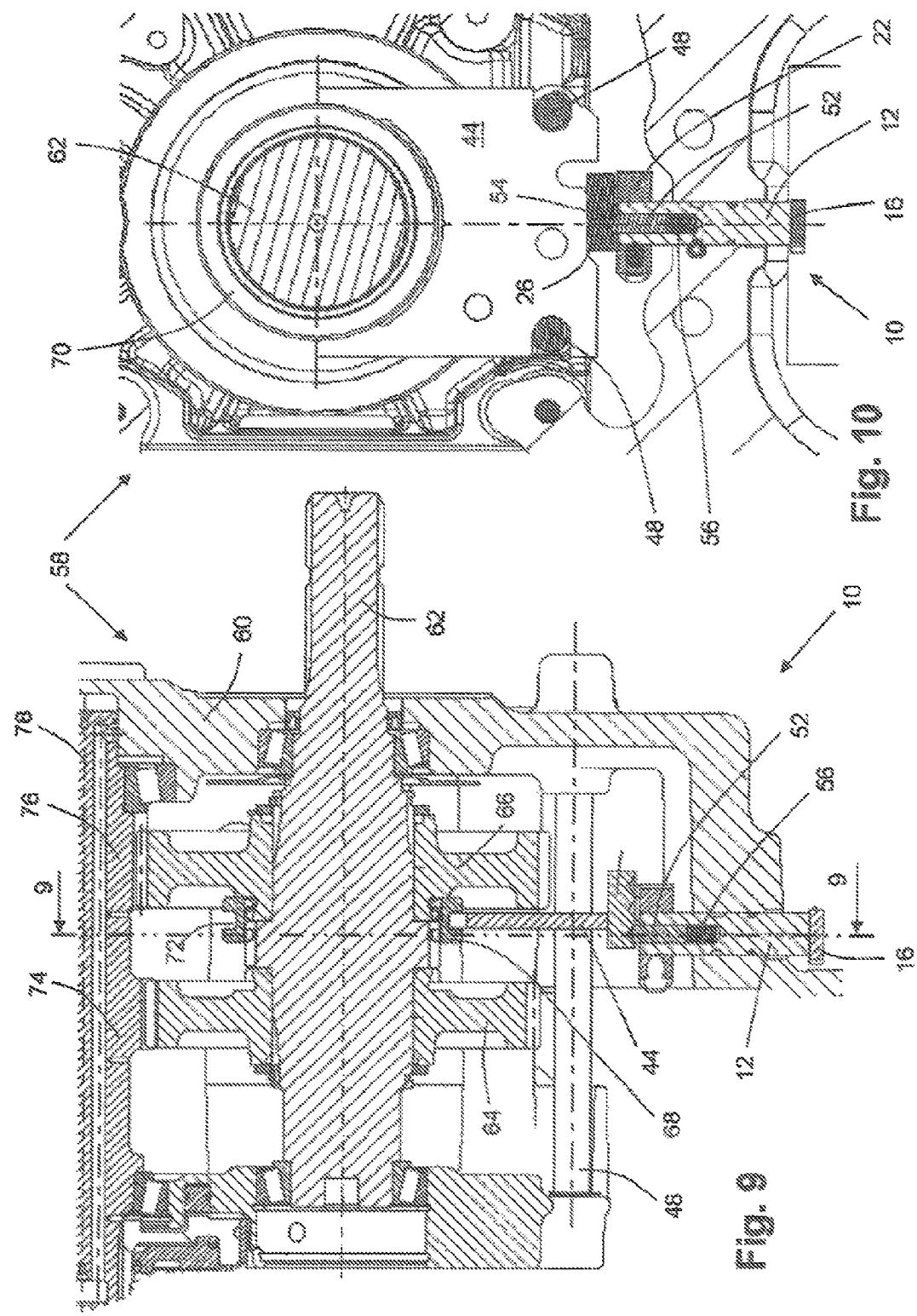

SHIFTING ARRANGEMENT FOR DISPLACING A SELECTOR FORK

CROSS-REFERENCE TO RELATED APPLICATION(S)

This application claims priority to German Application No. DE 10-2005-038-681.4 filed on Aug. 16, 2005.

BACKGROUND OF THE DISCLOSURE

The invention relates to a shifting arrangement for displacing a selector fork of a multispeed transmission assembly along a selector rod, with a positioning element, mounted to be rotatable about an axis, that is connected to the selector fork, movably mounted on the selector rod, via a drive mechanism that is used to transform the rotational movement of the positioning element into a translational movement of the selector fork along the selector rod, and with a locking device for locking the selector fork in selected actuation positions.

The field of use of such shifting arrangements is multispeed transmissions in which the flow of force is produced via positive clutches, in particular, synchronous clutches. In such transmissions a synchronizer hub is connected rotationally fixed to a transmission shaft. Axially adjacent to the synchronizer hub there is a respective speed change gear, which is rotatably mounted on the driveshaft. Each speed change gear is connected on the side facing the synchronizer hub to a clutch element. Both the clutch element and the synchronizer hubs are provided with outer teeth. The inner teeth of a synchronizer sleeve, which surrounds a synchronizer hub circumferentially, is connected rotationally fixed to it and is displaceable in the axial direction, engage with the outer teeth of the synchronizer hub. To shift a gear, the synchronizer sleeve is displaced in the axial direction until the inner teeth of the sliding sleeve are engaged both with the outer teeth of the clutch element and the outer teeth of the synchronizer hub.

The outer circumference of the synchronizer sleeve is provided with a circumferential groove in which the selector fork positively engages. The selector fork is mounted on one or more selector rods to be axially displaceable. An axial displacement of the selector fork on the selector rod by means of a likewise displaceable positioning element leads to a displacement of the synchronizer sleeve in the direction of a speed change gear, and thus to a shift to that speed. There are also embodiments in which the positioning element, and along with it the selector fork, is rotated about the axis of the positioning element, which likewise leads to a displacement of the synchronizer sleeve along the transmission shaft. In another known embodiment, the selector fork is pivotably mounted a distance away from the positioning element on the synchronizer sleeve by dowel pins on the transmission housing, and is pivoted by the positioning element around the dowel pins for shifting.

Cams are also known for shifting more than two gears sequentially with a single positioning element. The cam, rotatable by means of the positioning element, has one or more recessed control cams in which the cam followers, each interacting with the selector fork, engage. Two synchronizer sleeves can be moved by means of suitable numbers and shapes of control cams. Each of the synchronizer sleeves can connect the synchronizer hub associated with it selectively to one or two speed change gears.

The selector fork is moved relative to the selector rod by means of a positioning element that is linked mechanically, i.e. by cables, rods, lever mechanisms or the like, to a gearshift lever that is manually operated by the driver. In other embodiments, externally powered motors are used for moving the positioning element, which make it possible to automate shifting.

An unintended displacement of the selector fork, for instance as a result of shocks during travel, leads to an unintended frictional engagement or to an unintended loss of frictional engagement between the speed change gear and the transmission shaft. In order to avoid this, it is widely known to equip the positioning element or the selector fork with a locking device that locks it in the desired actuation position.

US 2004/0154425 A describes a shifting assembly for a selector fork that comprises a rotatably mounted gearwheel that can be set into motion by a motor via a worm gear. The gearwheel bears a pin, running parallel to the rotational axis of the gearwheel but offset eccentrically outwards with respect to the axis, that extends into a groove of a selector fork assembly. The selector fork assembly is displaceably mounted on a selector rod and cooperates with the circumferential groove of the synchronizer sleeve. The rotational motion of the gearwheel is thus converted into a translational movement of the selector fork by the pin in the groove of the selector fork assembly. The selector fork is locked in its actuating position only by the motor which in the turned-off state holds the worm gear and the gearwheel meshing with it in position. This has the disadvantage that the motive connection between the selector fork assembly and the gearwheel (i.e., the pin and the groove in the selector fork assembly) must permanently transfer the retention forces, so that it must be constructed sufficiently durably, and nevertheless undergoes permanent wear.

It is proposed in DE 198 33 101 A that a displaceable or pivotable positioning element of a vehicle transmission be engaged by means of a locking element. The positioning element comprises a ramp profile in which a ball of the locking element that is resiliently tensioned against the ramp profile engages. The locking element extends through an opening in the transmission housing up to the positioning element arranged therein. Nevertheless, additional measures must be taken to mount the locking element in the transmission housing. In compact transmission casings there is not necessarily sufficient space to mount the locking element.

DE 103 42 133 A describes a locking device for position fixation of a selector fork of a multistage transmission that can be displaced on a selector rod. The locking device snaps the selector fork, or a hub supporting it on the selector rod, into the selector rod. It is considered disadvantageous that the selector rod must be furnished with characteristics (holes or recesses) with which the locking device can interact. Due to the necessary precision, manufacturing of the selector rod accordingly proves to be elaborate and expensive.

SUMMARY OF THE DISCLOSURE

The problem underlying the invention is to provide a shifting arrangement for a selector fork with a simple and economically manufactured locking device.

This problem is solved according to the invention by the teaching of Claim 1, with characteristics that further develop the solution in an advantageous manner being specified in the additional claims.

The shifting arrangement comprises a positioning element that is rotatably mounted in the transmission housing. A suitable drive mechanism converts the rotational movement of the positioning element into a translational movement of the selector fork along the selector rod. If the positioning element is rotated, the selector fork moves relative to it. It is proposed that a locking device for locking the selector fork in its actuating position use this relative motion. The locking device is therefore set up to provide, in the selected actuating positions of the selector fork, a selective locking connection between the positioning element fixed on the transmission housing, or an element moving along with the positioning element, and the selector fork moving linearly with respect to the transmission housing into its selected actuating positions, or an element moving along with it.

In this manner means for mounting the locking device on the transmission housing or on the selector rod are unnecessary. This shifting arrangement according to the invention requires only a few additional elements for the locking device.

The drive mechanism for converting the rotational movement of the positioning element into a translational movement of the selector element can comprise a carrier with a pin, offset with respect to the rotational axis of the positioning element, and a slotted element, into the groove of which the pin engages. When the positioning element rotates, the pin moves in the groove such that the desired conversion of the rotational movement into a linear movement is realized. In a preferred embodiment, the carrier is connected to the positioning element while the slotted element is coupled to the selector fork. A reverse arrangement is also conceivable, however, in which the carrier is connected to the selector fork, while the slotted element is coupled to the positioning element. In both embodiments, the groove can be straight or curvilinear in construction, in a conventional manner. In this case the slotted element can comprise one or two curvilinear grooves each interacting with one of two pins that are connected to a selector fork. Instead of the slotted element one could also use an element with only a surface contacting the pin, but would then need a spring in order to tension the element against the pin and in this manner enable a displacing motion of the element.

The locking device preferably comprises a spring and a locking element, which is biased by the spring into a locking recess. It is arbitrary within the context of the inventive concept whether the locking recess is connected to the selector fork or the positioning element, or is provided therein, while the spring and the locking element are then connected to the positioning element or the selector fork. The former embodiment has the advantage that the spring can be housed inside the positioning element and the locking element can also run in a suitable end-face opening or borehole in the positioning element, so that a compact structure of the locking device results. This opening is preferably arranged on the axis of rotation of the positioning element, which has advantages in terms of manufacturing technology because of the symmetry. One could also arrange the opening remote from the axis of rotation of the positioning element, however. The locking recess in this embodiment is arranged, for instance, directly in the selector fork or an element connected to it.

It is possible in terms of design to seat the drive mechanism in different angular positions with respect to the positioning element, in particular, offset by 180° relative to it. The association between the angular position of the positioning element and the position of the selector fork is thereby modified, which allows a flexibility with respect to the positioning of two pairs of gears that can be selectively brought into motive connection with the shaft by means of a synchronizer sleeve operated by the selector fork. Particularly in a case of very different transmission ratios of two gear pairs controllable with the selector fork, advantages in the manufacturing of the transmission can be achieved by virtue of the thus-obtained possibility of making a suitable selection of the position of the gears. In addition, deflection of the drive shaft and the output shaft can be achieved, and the specific service lives of the shaft bearings can be improved.*

* [Note: This passage was probably intended to describe a possible reduction of deflection.]

Another advantage of the invention is that no modifications or adaptations of the transmission housing are required to house the locking device. In place of the shifting arrangement of the invention, it is also possible to install in the housing a known shifting arrangement having a cam disc, connectable to the positioning element, with control cams in which cam followers cooperating with the selector fork engage. The cam disc can be locked by locking elements to the housing in the actuating positions of the selector fork.

The transmission assembly with the shifting arrangement of the invention is used particularly in the drivetrains of utility vehicles, more particularly utility vehicles such as self-propelled harvesting machines or tractors. It can be used in the drivetrain serving for propulsion of the vehicle, or to drive a power takeoff shaft.

BRIEF DESCRIPTION OF THE DRAWINGS

An exemplary embodiment of the invention described in detail below is represented in the drawings.

FIG. 3 is an oblique view of an assembled shifting arrangement in a first actuating position, FIG. 4 shows the assembled shifting arrangement from FIG. 3 in a second actuating position, FIG. 5 is a lateral cross section through a two-stage transmission with the shifting arrangement from FIGS. 1-4, in the neutral position, FIG. 6 is a cross section of the transmission from FIG. 5 along the line 6-6, FIG. 7 is a lateral cross section through the transmission from FIG. 5 with an engaged first change gear, FIG. 8 is a cross section of the transmission from FIG. 7 along the line 8-8, FIG. 9 is a lateral cross section through the transmission from FIG. 5 with an engaged second change gear, FIG. 10 is a cross section of the transmission from FIG. 9 along the line 9-9.

DETAILED DESCRIPTION OF THE DRAWINGS

Figure 2:
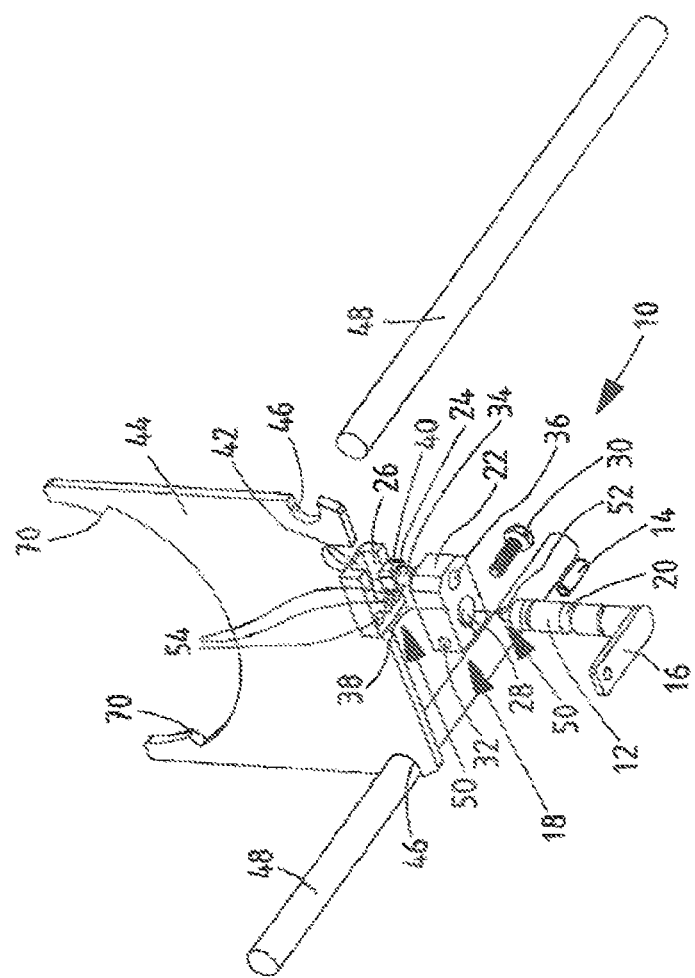
FIG. 2 is an exploded view of the shifting arrangement from FIG. 1, viewed from the opposite side.
Figure 1:
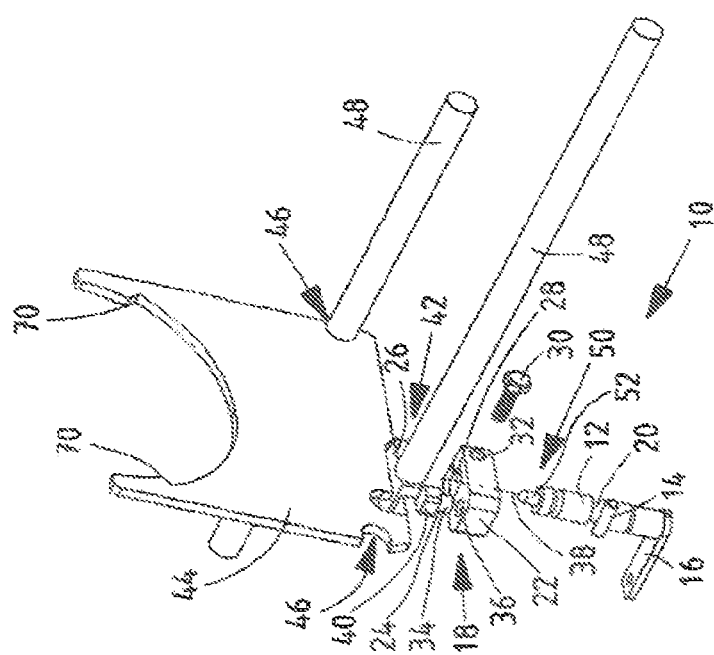
FIG. 1 shows an exploded view of a shifting arrangement according to the invention.

FIGS. 1 and 2 show oblique exploded views of the shifting arrangement 10 according to the invention. It comprises a cylindrical positioning element 12 that is mounted to be rotatable about its longitudinal axis and is secured against axial displacement by a dowel pin or hollow pin 14 that cooperates with a groove 20 in positioning element 12. A lower lever 16 connected to positioning element 12 is mechanically linked by way of a cable and or lever mechanism, not shown, to a shift lever (not shown here) with which an operator can manually select the desired transmission stage of the transmission. Alternatively, lever 16 or positioning element 12 is connected to a motor operated by external power that can be controlled independently by a controller.

Shifting arrangement 10 further comprises a drive mechanism 18 for converting the rotational motion of positioning element 12 into a translational motion. Drive mechanism 18 is composed of a carrier 22, a pin 24 and a slotted element 26. Carrier 22 has a first opening 28 that can be slipped onto the positioning element 12. A bolt 30 is driven into a borehole 32 of carrier 22, which is slit in the vicinity of borehole 32. Borehole 32 runs perpendicular to borehole 28 and is partially furnished with threads. Alternatively or additionally, bolt 30 is secured by a nut at its end remote from the head. In the assembled state, bolt 30 clamps carrier 22 tightly against positioning element 12 by pressing the slit in carrier 22 together.

Pin 24 has a cylindrical lower section 34 which is housed in a borehole 36 in carrier 22. Borehole 36 runs parallel to axis 38 of positioning element 12, but is radially offset with respect to it, i.e., arranged eccentrically. Pin 24 further comprises a head 40 with a rectangular cross section, which is arranged in the assembled state inside a slot 42 of slotted element 26 that runs perpendicular to the longitudinal direction of selector rods 48. Pin 24 is accordingly rotationally fixed to slotted element 26 but is displaceable along slot 42. In another embodiment it is rotationally fixed to carrier 22 and is rotatable with respect to slotted element 26.

Slotted element 26 is constructed integrally with a selector fork 44 which at two openings 46 is movably mounted on two selector rods 48. The one-piece construction of slotted element 26 and selector fork 44 can be achieved by means of a casting process. Slotted element 26 and selector fork 44 can also be constructed in two parts, however, and joined together by arbitrary processes, in particular, forging or welding processes. An adhesive, riveted, soldered or threaded connection form would also be conceivable.

If positioning element 12 is rotated by lever 16 about its axis 38, pin 24, moving along an eccentric curve path relative to axis 38 due to the motion of carrier 22, has the effect that its head 40 carries along slotted element 26, so that the selector fork is displaced along selector rod 48.

A locking device 50 that is composed of a locking element 52 and locking recesses 54 serves to lock selector fork 44 in its actuating positions, which correspond to the selected transmission stages of the transmission or to an idle position. Locking element 52 is arranged on the top side of positioning element 12 in a borehole arranged on axis 38 and is biased by a spring 56 (see FIG. 5) upward, in the direction towards locking recesses 54. The locking recesses 54 are centrally arranged on the underside of selector fork 44, i.e., alongside slot 42 in slotted element 26. Three locking recesses are arranged one after another in the longitudinal direction of selector rods 48. Locking device 50 could also be arranged in carrier 22, in which case the position of locking recesses 54 would have to be adapted.

FIGS. 3 and 4 clarify the mode of operation of drive mechanism 18. The rotation of lever 16, positioning element 12 and carrier 22 is transformed by pin 24, moving perpendicular to the longitudinal direction of selector rods 48 and slot 42, into a linear movement of slotted element 26 and selector fork 44. In the actuating positions of selector fork 44, locking element 52 of locking device 50 moves with its rounded head into one of the locking recesses 54 and prevents undesired movements of selector fork 44.

With bolt 30 loosened, carrier 22 can be rotated by 180° with respect to positioning element 12. If the selector fork is then rotated by 180°, pin 24 again comes into engagement with slot 42, and locking element 52 engages with locking recesses 54. One thereby obtains a reversed arrangement of the positions of lever 16 and selector fork 44, which in turn implies an additional degree of freedom in the design of the transmission.

FIGS. 5-10 show a transmission assembly 58 in which the above described shifting arrangement 10 is used. Inside a housing 60 there is a first shaft 62, on which at first speed change gear 64 and a second speed change gear 66 are arranged to be freely rotatable. A selector sleeve 68 with a peripheral channel 72 is arranged to be axially displaceable on shaft 62. It is furnished with internal teeth that mesh with external teeth of shaft 62 (or a synchronizer hub (not shown) fixedly connected to shaft 62). Projections 70 of selector fork 44 engage in channel 72 of selector sleeve 68 so that the latter can be displaced axially and the internal teeth of selector sleeve 68 can be selectively brought into engagement with the external teeth of one of the two adjacent speed change gears 64, 66. Speed change gears 64, 66 mesh with additional gears 74, 76 that are mounted rotationally fixed on a second shaft 78. Selector sleeve 68 can thereby be moved from the idle position shown in FIGS. 5 and 6 into a position in which the force flow is transmitted from the first shaft 62 via speed change gear 64 and gearwheel 74 to second shaft 78 (or back to idle) as is shown in FIGS. 7 and 8, and can be brought into a position in which the force flow is transmitted from first shaft 62 via speed change gear 66 and gearwheel 76 to second shaft 78 (or back to idle) as is shown in FIGS. 9 and 10. In each of the three above-mentioned actuating positions of selector fork 44 shown in FIGS. 5-10, locking element 52 engages in a different respective locking recess 54. The transmission assembly 58 represented here accordingly has two transmission stages. It must also be noted that axis 38 of positioning element 12 can intersect the central axis of first shaft 62, but need not necessarily do so.

Figure 11:
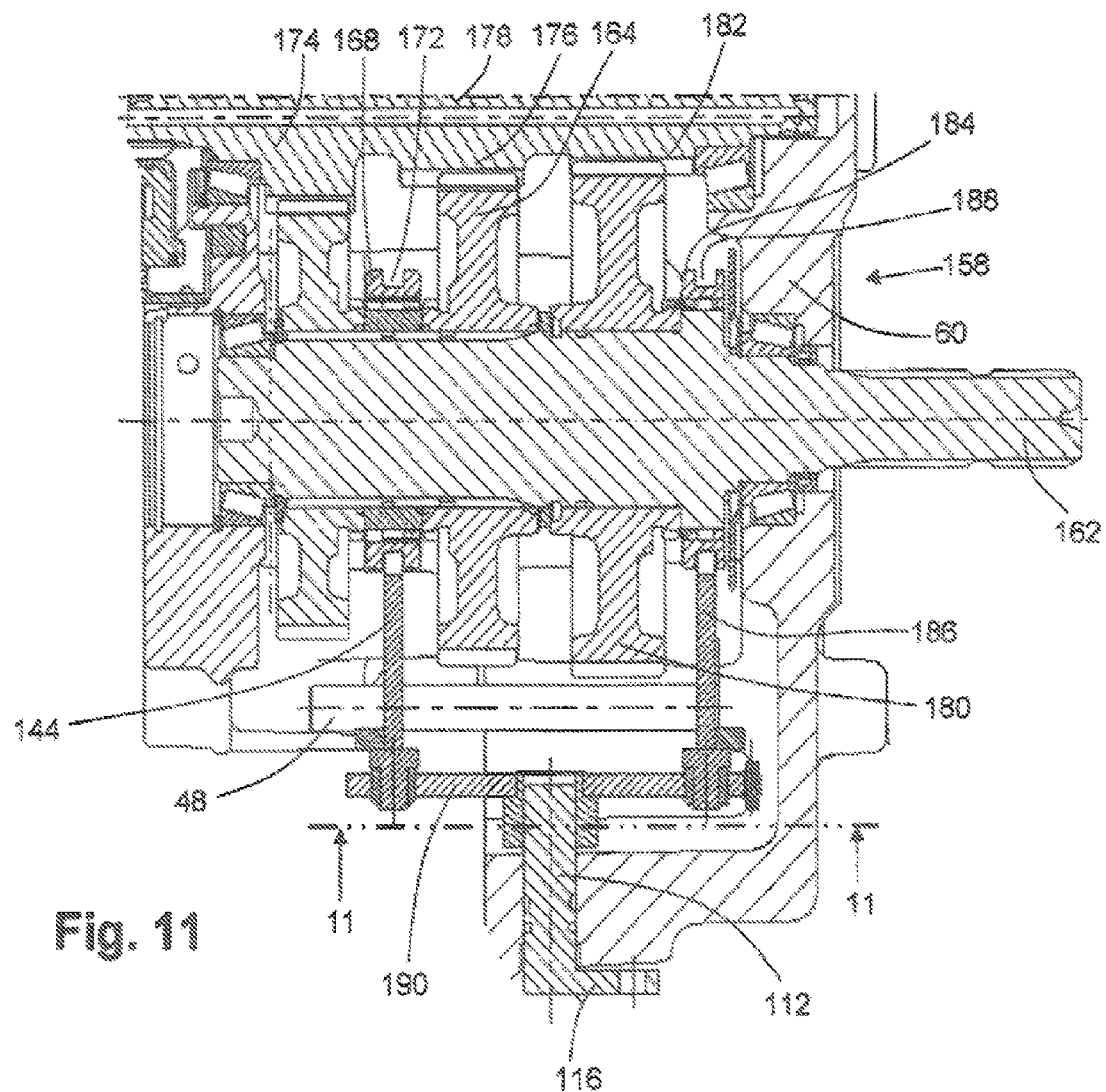
FIG. 11 is a lateral cross section of the transmission housing shown in FIGS. 5-10, with a transmission with three transmission stages arranged therein and a different shifting arrangement.

Without substantial changes, transmission housing 60 shown in FIGS. 5-10 can also accommodate a three-stage transmission assembly as shown in FIG. 11. Transmission assembly 158 likewise comprises a first shaft 162, a second shaft 178, a first speed change gear 164, a second speed change gear 166, gearwheels 174, 176, arranged rotationally fixed on a second shaft 178, that engage with said speed change gears, and a selector sleeve 168 which can be brought into selective engagement with speed change gear 164 or 166 by a selector fork 144 selectively engaging in channel 172 of synchronizer sleeve 168.

Transmission assembly 158 further comprises a third speed change gear 180 on first shaft 162 and a third gearwheel 182 on second shaft 178. A second selector sleeve 184 is likewise axially displaceable on first shaft 162 and serves to produce a selectable connection of shaft 162 to third speed change gear 180. A second selector fork 186 engages in a channel 188 of second selector sleeve 184 in order to displace the latter axially.

The translational movement of selector forks 144, 186 is accomplished in transmission assembly 158 via lever 116 and positioning element 112 rotatably mounted in housing 60, which are identical to their counterparts from FIGS. 1-10. Positioning element 112 is connected, however, to cam disc 190, in which control cams 194 (see FIG. 11) are formed that cooperate with cam followers 192 that in turn move selector forks 144 and 186, respectively.

Figure 12:
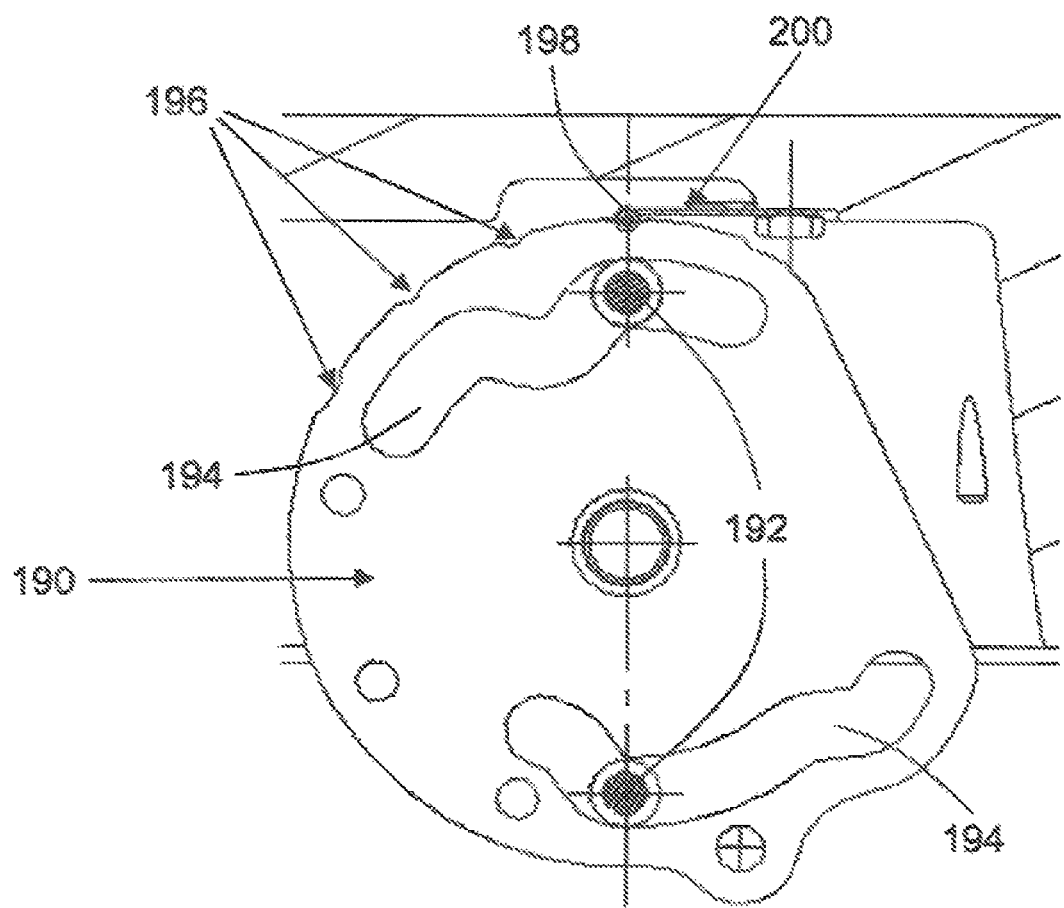
FIG. 12 is a cross section through the shifting arrangement of the transmission from FIG. 11 along the line 11-11.

It is recognizable from FIG. 12 that cam disc 190 has peripheral recesses 196 that cooperate, in order to lock cam disc 190 in its engagement positions, with a locking element 198 that is mounted on housing 60 by means of a spring 200 that tensions locking element 198 into recesses 196. The shifting path that enables three-stage shifting in transmission assembly 158 according to FIGS. 11 and 12 is identical to the shifting path of the two-stage transmission assembly 58 according to FIGS. 5-10.

The invention claimed is:

1. A shifting arrangement for displacing a selector fork of a multispeed transmission assembly along a selector rod, comprising:
    a positioning element rotatable about an axis and connected to the selector fork which is movably mounted on the selector rod;
    a drive mechanism that converts rotational movement of the positioning element into a translational movement of the selector fork along the selector rod; and
    a locking device for locking the selector fork in selected actuating positions;
    wherein the locking device creates a locking connection between the positioning element, or an element moving with the positioning element, and the selector fork, or an element moving with the selector fork; and
    wherein the locking device is arranged coaxially to the axis of the positioning element.

2. The shifting arrangement of claim 1, wherein the drive mechanism includes a carrier with a pin arranged eccentrically to the axis of the positioning element and a slotted element equipped with a slot into which the pin is engaged.

3. The shifting arrangement of claim 2, wherein the pin is mounted rotatably with respect to the carrier and rotationally fixed with respect to the slotted element.

4. The shifting arrangement of claim 2, wherein the pin has a cylindrical body and a rectangular head, and wherein the cylindrical body is disposed in a bore in the carrier and the head is disposed in the slot of the slotted element.

5. The shifting arrangement of 1, wherein the locking device includes a spring and a locking element that is biased by the spring into one of several locking recesses.

6. The shifting arrangement of claim 5, wherein the locking recesses are provided in the slotted element and the spring is supported on the positioning element.

7. The shifting arrangement of claim 1, wherein the locking device is arranged at least in part inside an end-face opening of the positioning element.

8. The shifting arrangement of claim 1, wherein the drive mechanism is fixable in different angular positions with respect to the positioning element.

9. A transmission assembly for a drivetrain of a utility vehicle, comprising:
    a first shaft on which a speed change gear is rotatably mounted;
    a second shaft that bears a gearwheel meshing with the speed change gear;
    a selector sleeve mounted displaceably with respect to the first shaft, wherein in a first position the selector sleeve establishes a torque-conductive connection between the first shaft and the speed change gear, and in a second position of the selector sleeve, the torque-conductive connection is broken; and
    a shifting arrangement moving the selector sleeve between the first and second positions, the shifting arrangement including:
    a selector rod;
    a selector fork;
    a positioning element rotatable about an axis;
    a drive mechanism that converts rotational movement of the positioning element into a translational movement of the selector fork along the selector rod; and
    a locking device arranged coaxially to the axis of the positioning element, the locking device creating a locking connection between the positioning element and the selector fork and locking the selector fork in selected actuating positions.

10. The transmission assembly of claim 9, wherein the drive mechanism includes a carrier with a pin arranged eccentrically to the axis of the positioning element and a slotted element equipped with a slot into which the pin is engaged.

11. The transmission assembly of claim 10, wherein the pin is mounted rotatably with respect to the carrier and rotationally fixed with respect to the slotted element.

12. The transmission assembly of claim 10, wherein the pin has a cylindrical body and a rectangular head, and wherein the cylindrical body is disposed in a bore in the carrier and the head is disposed in the slot of the slotted element.

13. The transmission assembly of claim 9, wherein the locking device includes a spring and a locking element that is biased by the spring into one of several locking recesses.

14. The transmission assembly of claim 13, wherein the locking recesses are provided in the slotted element and the spring is supported on the positioning element.

15. The transmission assembly of claim 9, wherein the locking device is arranged at least in part inside an end-face opening of the positioning element.

16. The transmission assembly of claim 9, wherein the drive mechanism is fixable in different angular positions with respect to the positioning element.

* * * * *